United States Patent
Corrion

(10) Patent No.: US 9,122,335 B2
(45) Date of Patent: Sep. 1, 2015

(54) DYNAMIC BEZEL FOR A MOBILE DEVICE

(71) Applicant: Intel Corporation, Santa Clara, CA (US)

(72) Inventor: Bradley Corrion, Chandler, AZ (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 14/218,496

(22) Filed: Mar. 18, 2014

(65) Prior Publication Data

US 2014/0340331 A1   Nov. 20, 2014

Related U.S. Application Data

(63) Continuation of application No. 12/824,403, filed on Jun. 28, 2010, now Pat. No. 8,674,959.

(51) Int. Cl.
*G06F 3/041*   (2006.01)

(52) U.S. Cl.
CPC .............. *G06F 3/041* (2013.01); *G06F 3/0416* (2013.01)

(58) Field of Classification Search
CPC ................................ G06F 3/041; G09G 5/005
USPC .................................................. 345/173–178
See application file for complete search history.

(56) References Cited

U.S. PATENT DOCUMENTS

| | | | |
|---|---|---|---|
| 7,091,964 B2* | 8/2006 | Wong et al. | 345/184 |
| 2006/0197753 A1* | 9/2006 | Hotelling | 345/173 |
| 2008/0272927 A1* | 11/2008 | Woolley et al. | 340/815.4 |
| 2009/0054105 A1 | 2/2009 | Hermel | |
| 2013/0222286 A1* | 8/2013 | Kang et al. | 345/173 |
| 2014/0184512 A1* | 7/2014 | Okuley et al. | 345/168 |
| 2014/0306905 A1* | 10/2014 | Kim et al. | 345/173 |
| 2014/0334636 A1* | 11/2014 | Park et al. | 381/77 |
| 2015/0062206 A1* | 3/2015 | Osborne | 345/698 |

OTHER PUBLICATIONS

Office Action received for Chinese Patent Application No. 201180002822.8, mailed Aug. 26, 2014, 14 pages including 8 pages English translation.

* cited by examiner

*Primary Examiner* — Andrew Sasinowski
(74) *Attorney, Agent, or Firm* — Kacvinsky Daisak Bluni PLLC

(57) ABSTRACT

An article, device and method may detect a touch of a human hand on an interactive area of a user interface display of a mobile device. A non-interactive area may be displayed on the user interface display in at least a location of the touch of the human hand.

20 Claims, 5 Drawing Sheets

DYNAMIC BEZEL FOR A MOBILE DEVICE

CROSS REFERENCE TO RELATED APPLICATIONS

This application is a continuation of, claims the benefit of and priority to, previously filed U.S. patent application Ser. No. 12/824,403 entitled "A DYNAMIC BEZEL FOR A MOBILE DEVICE" filed on Jun. 28, 2010, the subject matter of which is hereby incorporated by reference in its entirety.

BACKGROUND

There is a desire to maximize the screen for handheld devices. By maximizing the screen, the usable area of the device is increased. However, for touch screen handheld devices, if the usable area extends fully to the edge, the hand held device becomes awkward to hold as supporting fingers inadvertently interfere with the hand held device's operation. If the handheld device includes a bezel large enough for a user's hand, the size of the screen is reduced.

DETAILED DESCRIPTION

Various embodiments may be generally directed to a non-interactive virtual bezel for a mobile device. In one embodiment, for example, a location of a touch of a human hand on an interactive area of a user interface display of a mobile device may be detected. A non-interactive area may be displayed on the user interface display in at least a location of the touch of the human hand.

In an embodiment, for example, a mobile device may include a screen that extends to the edge of the mobile device. The screen may include a user interface display with a dynamically adjustable interactive area of the user display interface. When the device detects that no human hands are holding the screen, the interactive area of user interface display may expand to the edges of the device. When the device detects a human hand holding the screen, the size of the interactive area of the user interface display may be reduced. At least the location of the touch of the human hand may become a non-interactive, decorative, virtual bezel. A dynamic non-interactive virtual bezel, formed as a result of a user's human hand holding the device, may be prevent unwanted and/or unintended action by the user.

Other embodiments may be described and claimed. Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
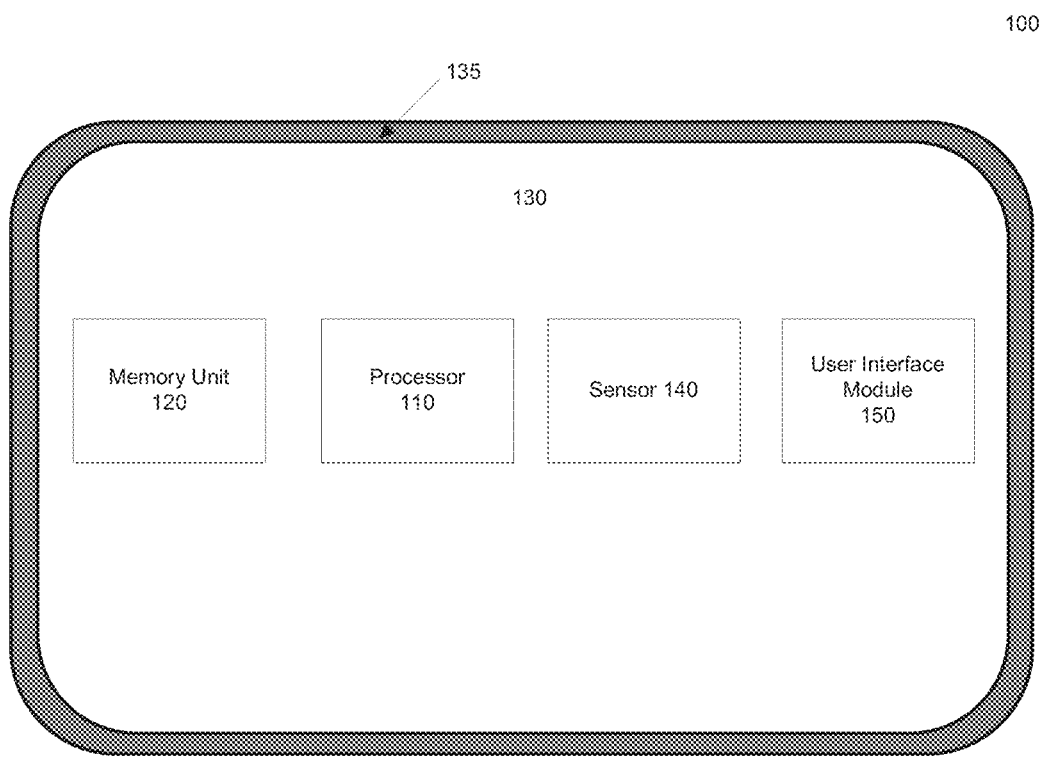
FIG. 1 illustrates one embodiment of a system.

FIG. 1 illustrates one embodiment of a system. FIG. 1 illustrates a block diagram of one embodiment of a mobile device 100. Although FIG. 1 may show a limited number of nodes by way of example, it can be appreciated that more or less nodes may be employed for a given implementation.

Mobile device 100 may include, but is not limited to, a laptop, a notebook, a handheld computer, a handheld enclosure, a portable electronic device, a mobile internet device (MID), a table, a slate and/or a personal digital assistant. The embodiments, however, are not limited to this example.

As shown in the illustrated embodiment of FIG. 1, the mobile device 100 may include a processor 110, a memory unit 120, a screen 130, a sensor 140 and user interface module 150. The embodiments, however, are not limited to the elements shown in FIG. 1.

As shown by the mobile device 100, the mobile device 100 may comprise a processor 110. The processor 110 may be implemented as any processor, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processor 135 may be implemented as a general purpose processor, such as a processor made by Intel® Corporation, Santa Clara, Calif. The processor 110 may be implemented as a dedicated processor, such as a controller, microcontroller, embedded processor, a digital signal processor (DSP), a network processor, a media processor, an input/output (I/O) processor, and so forth. The embodiments are not limited in this context.

As further shown by the mobile device 100, the mobile device 100 may comprise a memory unit 120. The memory unit 120 may comprise any machine-readable or computer-readable media capable of storing data, including both volatile and non-volatile memory. For example, the memory 120 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of the memory 120 may be included on the same integrated circuit as the processor 110, or alternatively some portion or all of the memory 120 may be disposed on an integrated circuit or other medium, for example a hard disk drive, that is external to the integrated circuit of the processor 110. In an embodiment, the memory may include data and instructions to operate the processor. The embodiments are not limited in this context.

The mobile device 100 may comprise a screen 130. In an embodiment, the screen 130 may comprise an organic light emitting diode (OLED) display, a liquid crystal display (LCD), or other glass and/or plastic materials. In an embodiment, the screen 130 may provide high brightness and/or contrast. For example, the screen may have a 2000:1 contrast. In an embodiment, the screen 130 may have a wide aspect ratio. In an embodiment, the screen 130 may be located on the side of the mobile device. In an embodiment, the screen 130 may be located on a front side or the main side of mobile device. In an embodiment, the screen 130 may extend to the edge of the mobile device 100. For example, the mobile device may have no visible physical bezel connecting or joining the screen 130 to the edge of the mobile device 100. In an embodiment, the mobile device may have a small physical bezel 135 around the edge of the screen that forms the rim or boarder connecting the screen 130 to the rest of the device.

In an embodiment, the screen 130 may include a user interface display and/or a touch screen. The user interface display and/or touch screen may include a graphical user interface. In an embodiment, the entire screen 130 may include a user interface display and/or a touch screen. In an embodiment, only a part of the screen 130 may include a user interface display and/or a touch screen. In an embodiment, the screen 130 with a user interface display may include one or more interactive and/or non-interactive areas.

In an embodiment, the screen 130 may display text, symbols and/or images. In an embodiment, the screen 130 may include a monochromatic display screen. In an embodiment, the screen 130 may include a red/green/blue (RGB) display. In an embodiment, the screen 130 may include a background display color. For example, the screen 130 may have a variety of background colors including, but not limited to, red, blue, yellow, white, clear, pink, green, etc. In an embodiment, the background color may be based on the user interactive display on the screen 130. In an embodiment, the one or more colors on the screen 130 may vary based on whether the area of the user interface display is interactive or non-interactive.

In various embodiments, the mobile device 100 may comprise a sensor 140. In an embodiment, the sensor 140 may be used, along with user interface module 150, to determine when a human hand is on and/or touching the screen 130. In an embodiment, the sensor 140 and the user interface module 150 may determine the movement of a user's hand. In an embodiment, the sensor 140 and the user interface module 150 may determine a touch of a human hand. In an embodiment, the sensor 140 and the user interface module 150 may determine the movement of at least a portion of a human hand via the touch of one or more fingers. In an embodiment, a sensor 140 may use, but is not limited to, detect a location of a touch of a human hand via capacitive touch technology and/or resistive touch technology. The embodiments are not limited in this context.

In an embodiment, the sensor 140 and the user interface module 150 may determine when a user's hand is holding the mobile device 100. In an embodiment, the sensor 140 and the user interface module 150 may identify a lack of motion by the human hand holding the mobile device 100. In an embodiment, the sensor 140 and analysis from the user interface module 150 may determine that a human hand is motionless. The sensor 140 and/or the user interface module 150 may identify coordinates which are common touch points of a user's hand on and/or against a mobile device 100. In an embodiment, the coordinates may be geographical coordinates. In an embodiment, the common touch points may be common locations where a user's hand holds the device. Based on the movement, positioning and/or coordinates of the human hand, the user interface module 150 may determine whether the user's hand is actively using the mobile device 100 or if the user's hand is holding onto the mobile device 100.

In an embodiment, the device may be able to sense a touch from a human hand from one or more other sides of the device. For example, the device may include a detection sensor on the physical bezel 130 and/on the backside of the device (not shown). The detection sensor may be a part of or separate from sensor 140. In an embodiment, a sensor may determine that a human hand touched and/or is touching the physical bezel and/or the backside of the device. The user interface module 150 may combine the information about one or more touch locations from the physical bezel and/or the backside of the device with information about one or more touch locations on the user interface display to determine if the user is holding the device.

In an embodiment, the device may display a non-interactive area on the user interface display when the device determines that a human hand is holding the device. In an embodiment, the user interface module may display a non-interactive virtual bezel on the user interface display when the user interface module determines that a human hand is holding the device. In an embodiment, the device may include a place for the user to touch if a non-interactive dynamic virtual bezel is incorrectly displayed. In an embodiment, a user may touch a location on the interactive area of the user interface display to indicate that the non-interactive virtual bezel was incorrectly displayed. In an embodiment, the location on the screen may vary based on the location of the non-interactive virtual bezel. In an embodiment, a user may touch a place on the device, such as, but not limited to, a button, a switch, a wheel and a scroll bar, to indicate that the non-interactive virtual bezel was incorrectly displayed. For example, a button may be located on the physical bezel or the backside of the device. A user may press the button to indicate that the non-interactive virtual bezel was incorrectly displayed. In an embodiment, once a user indicates that the non-interactive virtual bezel is incorrectly displayed, the non-interactive virtual bezel may be removed and replaced with an interactive user interface display.

Figure 2:
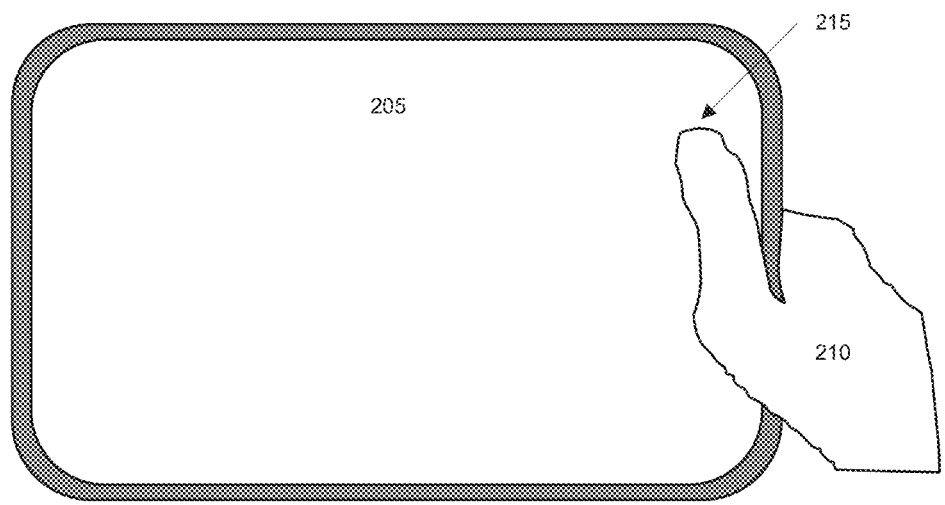
FIG. 2 illustrates one embodiment of an apparatus with a maximized interactive area on the user interface display.

FIG. 2 illustrates one embodiment of an apparatus with a maximized interactive area on the user interface display. As shown in FIG. 2, mobile device 200 has a maximized interactive area on the user interface display 205. The user interface display 205 includes the entire screen 130. In an embodiment, when the device detects that no hands are holding the display screen, the interactive area of the user interface display may fill the screen. In an embodiment, if the interactive area of the user interface display was previously reduced, the interactive area may expand to fill the screen. In an embodiment, the interactive area of the user interface display 205 may include all or a majority of the screen.

As shown in FIG. 2, a human hand 210 may hold the device on the edge of an interactive area of the user interface display 205 of the screen. In an embodiment, a user may place a portion of their hand, such as their thumb, 210 on the user interface display 205 in order to hold the mobile device 200. In an embodiment, the user may hold the device with the full length of their thumb 210. It may be detected that a human hand 210 is holding the device 200 on an interactive area. As a result, the interactive area of user interface display may be reduced. In an embodiment, it may be determined that the user's hand 210 is holding the device by the amount of time that the user's hand 210 is in a position touching an interactive area of the user interface display 205. In an embodiment, it may be determined that the user's hand 210 is holding the device by the location of the human hand 210 touching the device. For example, the location may be determined using coordinates. In an embodiment, at least the area 215 where the human hand touches the screen 210 may become a non-interactive area of the user interface display 205. In an embodiment, the area 215 where at least a portion of the human hand touches the screen 210 may become a non-interactive area of the user interface display 205. In an embodiment, the non-interactive area of the user interface display 205 may be a non-interactive virtual bezel. By excluding the area under the touch of the human hand from being an interactive area of the user interface display, unwanted and/or unintended action as a result of the human hand holding the device may be prevented.

Figure 3:
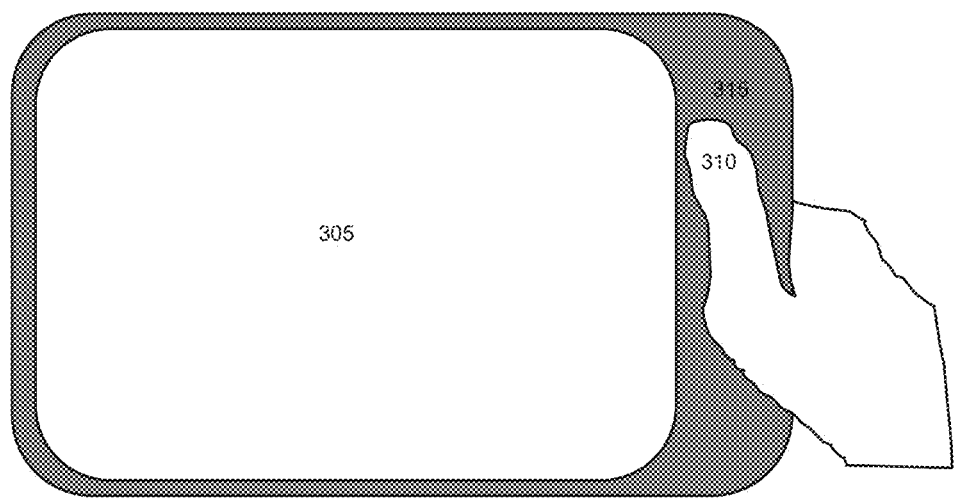
FIG. 3 illustrates a mobile device with a first example of a non-interactive virtual bezel according to an embodiment.

FIG. 3 illustrates a mobile device with a first example of a non-interactive virtual bezel according to an embodiment. As shown in FIG. 3, the interactive area of the user interface display on the screen may decrease in size to create a non-interactive area on the user interface display. In an embodiment, the non-interactive area of the user interface may be a virtual bezel. The virtual bezel may be a decorative, non-interactive area. In an embodiment, the display of the virtual bezel may be a different color than the display of the interactive area of the user interface display. The difference in color may be used to identify that the virtual bezel is a non-interactive area of the user interface display. For example, the interactive area of the user interface display may have a white background color with various colors for touch-screen buttons while the non-interactive virtual bezel on the user interface display may have a black color. In an embodiment, the display of the non-interactive virtual bezel may be colored so that the virtual bezel does not look like a part of the screen. In an embodiment, the display of the non-interactive virtual bezel may be colored so that it blends from the screen onto the device. In an embodiment, the display of the non-interactive virtual bezel may be colored so that it blends into a physical bezel on the device.

In an embodiment, the area and/or shape of the non-interactive virtual bezel may include a variety of forms. In an embodiment the non-interactive virtual bezel may be displayed under at least a portion of the human hand. In an embodiment, the virtual bezel may be a non-interactive rectangular area on the mobile device that extends from the edge of the side of the screen until past the point of the human hand touching the device. As shown in FIG. 3, the virtual bezel, or non-interactive area 315 of the user interface display, may cause the interactive area of the user interface display to reduce in size. The interactive area 305 of the user interface display may appear shifted to one side of the screen. In the example shown, the interactive area 305 of the user interface display may appear shifted to the left, because the virtual bezel 315, formed as a result of the human hand 310, may appear on the right side of the screen. In an embodiment, the interactive area 305 of the user interface display may appear shifted to the right because the virtual bezel 315, formed as a result of the human hand 310, may on the left side of the screen. In an embodiment, a user may have hands 310 on both sides (not shown) of the mobile device. As a result, virtual bezels may form on both sides of the screen and the interactive area of the user interface display 305 may appear in the center of the screen of the mobile device.

In an embodiment, the sensor may not respond to hand motions or movements on the non-interactive virtual bezel. In an embodiment, hand movements in the non-interactive virtual bezel may be disregarded by the sensor and/or the user interface module. In an embodiment, it may be determined whether a human hand is still located on the non-interactive virtual bezel. In an embodiment, the sensor may determine whether the human hand is still located on the non-interactive virtual bezel. In an embodiment, the device may determine whether the human hand is still located on the non-interactive virtual bezel by determining one or more touch locations of the human hand on the user interface display, the physical bezel and/or the backside of the device. In an embodiment, it may be determined whether the hand is still located on the non-interactive virtual bezel after a period of time. In an embodiment, a sensor, such as, but not limited to a touch sensor, may determine that the human hand was removed. In an embodiment, the device may use data for analyzing whether the human hand was removed. In an embodiment, the user interface module may be programmed with profiles of common parameters known to closely correlate with support grips from a human hand. In an embodiment, statistical analysis may be used to determine if the human hand is on or is removed from the device. If the device includes a place for a user to touch if a non-interactive dynamic virtual bezel was incorrectly displayed, statistical analysis may be used to determine which of the one or more touches by the human hand were incorrectly interpreted as non-interactive.

Figure 4:
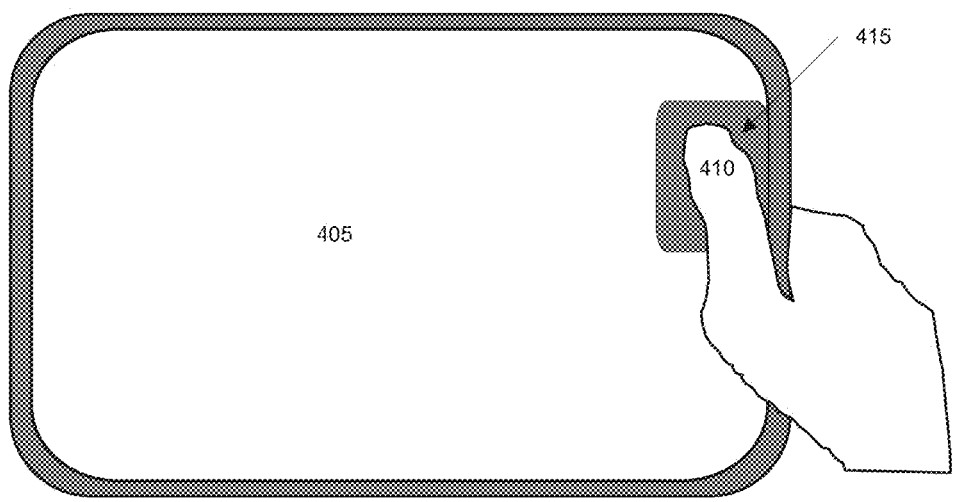
FIG. 4 illustrates a mobile device with a second example of a non-interactive virtual bezel according to an embodiment.

FIG. 4 illustrates a mobile device with a second example of a non-interactive virtual bezel according to an embodiment. In an embodiment, the virtual bezel or the non-interactive area of the user interface display may be the area surrounding the human hand. For example, the virtual bezel 415 may be an enlarged thumbprint on the display screen. As the virtual bezel 415, is only the area surrounding the human hand 410, the rest of the user interface display may be and/or may remain interactive 405. In an embodiment, the interactive and non-interactive areas of the user interface display may be differentiated by color. In an embodiment, the color of the screen will not change when an area of the user interface display becomes non-interactive. In an embodiment, the non-interactive area of the user interface display may be surrounded on all sides by the interactive area of the user interface display. In an embodiment, the non-interactive area of the user interface display may extend to at least one edge of the screen.

Figure 5:
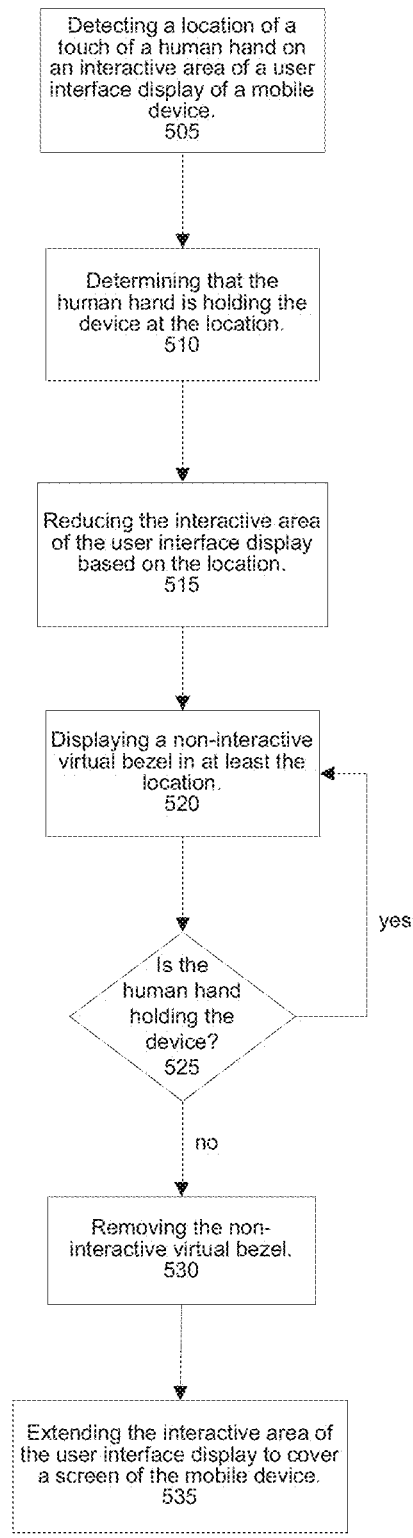
FIG. 5 illustrates one embodiment of a logic diagram for determining a size of a non-interactive virtual bezel.

FIG. 5 illustrates one embodiment of a logic diagram for determining a size of a non-interactive virtual bezel. Logic flow 500 may be representative of the operations executed by one or more embodiments described herein. As shown in logic flow 500, a touch of a human hand may be detected 505 on an interactive area of a user interface display of a mobile device. In an embodiment, the human hand may be detected 505 touching the device at one or more locations on the user interface display, the physical bezel and/or the backside of the mobile device. In an embodiment, a sensor may be used to determine a location of the touch of the human hand. In an embodiment, a sensor may be used to determine a location under the human hand. In an embodiment, the sensor may use resistive touch technology or capacitive touch technology. In an embodiment, locations of one or more touches of the human hand may be determined using coordinates.

In an embodiment, it may be determined 510 that the human hand is holding the device at the location. In an embodiment, it may be determined that the location of the touch of the human hand on the interface display is static, not moving and/or motionless. In an embodiment, the interactive area of the user interface display may be reduced 515 based on the location of the touch of the human hand. A non-interactive virtual bezel may be dynamically displayed 520 on the user interface display in at least the location under the human hand. In an embodiment, the non-virtual bezel may be displayed on a side of the screen. In an embodiment, the color of the display of the non-interactive virtual bezel may be a different color than the color of the display of the interactive area of the user interface display.

In an embodiment, it may be determined 525 whether the human hand is holding the device. If the human hand is and/or remains holding the device, a non-interactive virtual bezel may continue to be displayed. If the human hand is no longer holding the device, the non-interactive virtual bezel may be removed 530. In an embodiment, the interactive area of the user interface display may be extended 535 to cover the area of the screen previously displaying the non-interactive virtual bezel. In an embodiment, once it is determined that the human hand is no longer holding onto the user interface display, the entire user interface display may become interactive.

In an embodiment, a second touch may be detected on the interactive area of the user interface display the mobile device. In an embodiment, the second touch may be from a second human hand. In an embodiment, the second touch may be from the same human hand as the first touch. In an embodiment, a second non-interactive virtual bezel may be displayed on the user interface display in at least a second location of the second touch.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. .sctn. 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An article comprising a non-transitory machine-readable storage medium containing instructions that when executed by a processor enable a system to:
   detect a touch of a human hand on a display of a mobile computing device; and
   adjust an interactive area on the display to accommodate a non-interactive area, the non-interactive area comprising a virtual bezel, the virtual bezel arranged to extend from an edge of the display to a point defined by the detected touch on the display.

2. The article of claim 1, comprising instructions that when executed enable a system to detect one or more of a capacitive touch and a resistive touch.

3. The article of claim 1, further comprising instructions that when executed enable a system to:
   detect that the touch of the human hand is no longer on the non-interactive area of the user interface display; and
   remove the non-interactive area.

4. The article of claim 3, comprising instructions that when executed enable a system to extend the interactive area of the display to an edge of a screen on the mobile computing device.

5. The article of claim 1, further comprising instructions that when executed enable a system to:
   detect a second touch of a second human hand on the display of the mobile computing device; and
   adjust the interactive area on the display to accommodate a second non-interactive area in at least a second location of the second touch.

6. The article of claim 1, comprising instructions that when executed enable a system to display the interactive area of the user interface display in a first color and the non-interactive area in a second color.

7. The article of claim 1, comprising instructions that when executed enable a system to determine that the human hand remained in the location for at least a period of time.

8. The article of claim 1, comprising instructions that when executed enable a system to detect a touch of a human hand on a physical bezel of the mobile computing device, wherein the virtual bezel is arranged to extend from edge of the display proximate to a location defined by the detected touch of the human hand on the physical bezel.

9. The article of claim 1, comprising instructions that when executed enable a system to generate the non-interactive area on the display based at least on a location of the touch of the human hand on the display.

10. A mobile computing device comprising:
    a display;
    a user interface module operative to render one or more user interface elements on the display;
    a sensor to detect a touch of a human hand on the display, the user interface module operative to adjust an interactive area of the one or more user interface elements on the display to accommodate a non-interactive area, the non-interactive area comprising a virtual bezel arranged to extend from an edge of the display to a point defined by the detected touch on the display.

11. The device of claim 10, the user interface module operative to render the interactive area comprising a first color and the non-interactive area comprising a second color.

12. The mobile computing device of claim 10, the sensor operative to detect a touch of a human hand on a physical bezel of the mobile computing device, wherein the virtual bezel is arranged to extend from edge of the display proximate to a location defined by the detected touch of the human hand on the physical bezel.

13. The mobile computing device of claim 10, the user interface module operative to render the non-interactive area on the display based at least on a location of the touch of the human hand on the display.

14. The mobile computing device of claim 10, the sensor operative to detect that the touch of the human hand is no longer on the non-interactive area and the user interface module operative to remove the non-interactive area.

15. A computer implemented method comprising:
    detecting a location of a touch of a human hand on an interactive area of a user interface rendered on a display of a mobile computing device;
    generating a non-interactive area to be rendered in an area of at least a portion of the detected touch on the display, the non-interactive area comprising a virtual bezel arranged to extend from an edge of the display to a point defined by the detected touch on the display; and
    reducing the interactive area of the user interface to accommodate the non-interactive area.

16. The computer implemented method of claim 15, comprising determining that the human hand is in the location for at least a predetermined period of time.

17. The computer implemented method of claim 15, comprising detecting one or more of a capacitive touch and a resistive touch.

18. The computer implemented method of claim 15, comprising:
    detecting that the human hand is not on the user interface; and
    extending the interactive area of the user interface to substantially cover a display area of the mobile device.

19. The computer implemented method of claim 15, wherein the virtual bezel comprises a different color than the interactive area.

20. The computer implemented method of claim 15, comprising:
    detecting a second location of a second touch of a second human hand on the interactive area of the user interface;
    generating a second non-interactive area to be rendered in an area of at least a portion of the detected second touch on the display; and
    reducing the interactive area of the user interface to accommodate the second non-interactive area.

* * * * *